(12) United States Patent
Kim

(10) Patent No.: US 12,377,912 B2
(45) Date of Patent: Aug. 5, 2025

(54) APPARATUS, METHOD AND COMPUTER READABLE MEDIUM FOR CALCULATING TARGET STEERING ANGLE CONSIDERING YAW MOMENT BY TORQUE VECTORING WHEN TURNING DRIVING OF ELECTRIC VEHICLE IN AUTONOMOUS DRIVING

(71) Applicants: Hyundai Motor Company, Seoul (KR); Kia Corporation, Seoul (KR)

(72) Inventor: Gwi Chul Kim, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 253 days.

(21) Appl. No.: 17/955,288

(22) Filed: Sep. 28, 2022

(65) Prior Publication Data
US 2023/0406409 A1 Dec. 21, 2023

(30) Foreign Application Priority Data
Jun. 21, 2022 (KR) .................. 10-2022-0075627

(51) Int. Cl.
| | |
|---|---|
| *B62D 15/02* | (2006.01) |
| *B60W 10/20* | (2006.01) |
| *B60W 40/101* | (2012.01) |
| *B60W 40/109* | (2012.01) |
| *B60W 40/114* | (2012.01) |
| *B60W 40/13* | (2012.01) |

(Continued)

(52) U.S. Cl.
CPC ........... *B62D 15/021* (2013.01); *B60W 10/20* (2013.01); *B60W 40/101* (2013.01); *B60W 40/109* (2013.01); *B60W 40/114* (2013.01); *B60W 40/13* (2013.01); *B60W 50/0098* (2013.01); *B60W 60/001* (2020.02); *B60W 2040/1315* (2013.01); *B60W 2050/0008* (2013.01); *B60W 2050/0012* (2013.01); *B60W 2510/083* (2013.01); *B60W 2510/222* (2013.01); *B60W 2520/125* (2013.01); *B60W 2520/14* (2013.01); *B60W 2520/263* (2013.01); *B60W 2540/18* (2013.01)

(58) Field of Classification Search
CPC combination set(s) only.
See application file for complete search history.

(56) References Cited

U.S. PATENT DOCUMENTS

| | | | |
|---|---|---|---|
| 10,899,237 B2 * | 1/2021 | Torres ................. | B60L 15/2036 |
| 2017/0305455 A1 * | 10/2017 | Hisanaga ............. | B62D 5/0493 |
| 2022/0144341 A1 * | 5/2022 | Takhmar ............. | B62D 15/025 |

(Continued)

FOREIGN PATENT DOCUMENTS

KR 10-2021-0010729 A 1/2021

*Primary Examiner* — Peter D Nolan
*Assistant Examiner* — Mikko Okechukwu Obioha
(74) *Attorney, Agent, or Firm* — Morgan, Lewis & Bockius LLP

(57) ABSTRACT

An apparatus of determining a target steering angle, may include: a feedforward steering angle calculator configured for determining a feed forward steering angle reflecting a yaw moment generated by torque vectoring during turning driving of an electric vehicle in autonomous driving; and an adder configured for obtaining a target steering angle by adding the determined feedforward steering angle to a feedback steering angle, the feedback steering angle being a steering angle measured through a steering angle sensor.

13 Claims, 4 Drawing Sheets

(51) Int. Cl.
*B60W 50/00* (2006.01)
*B60W 60/00* (2020.01)

(56) References Cited

U.S. PATENT DOCUMENTS

2022/0348184 A1* 11/2022 Hiroi ............... B60W 30/18172
2023/0278630 A1* 9/2023 Ono .................... B62D 15/025
                   701/41

* cited by examiner

APPARATUS, METHOD AND COMPUTER READABLE MEDIUM FOR CALCULATING TARGET STEERING ANGLE CONSIDERING YAW MOMENT BY TORQUE VECTORING WHEN TURNING DRIVING OF ELECTRIC VEHICLE IN AUTONOMOUS DRIVING

CROSS-REFERENCE TO RELATED APPLICATION(S)

The present application claims priority to Korean Patent Application No. 10-2022-0075627 filed on Jun. 21, 2022 the entire contents of which is incorporated herein for all purposes by this reference.

BACKGROUND OF THE PRESENT DISCLOSURE

Field of the Present Disclosure

The present application relates to an apparatus, a method and a computer-readable storage medium for determining a target steering angle in consideration of a yaw moment by torque vectoring during turning driving of an electric vehicle in autonomous driving.

Description of Related Art

Torque vectoring control is a function of distributing torque transmitted to a motor (also referred to as an 'in-wheel motor') for driving each tire of an electric vehicle.

However, when torque vectoring control is performed during turning driving, a yaw moment is generated, and the generated yaw moment may further distort a steering angle of the electric vehicle.

Therefore, for example, when torque vectoring control is performed on an electric vehicle turning left, there is a problem in that the electric vehicle may turn further left than a target path due to a yaw moment generated by the torque vectoring.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus, a method and a computer-readable medium for determining a target steering angle considering a yaw moment by torque vectoring during turning driving of an electric vehicle in autonomous driving, which enables the electric vehicle to turn without departing from a target path even when torque vectoring is performed during turning driving.

According to an aspect of the present disclosure, an apparatus of determining a target steering angle, is provided. The apparatus of determining a target steering angle, includes: a feedforward steering angle calculator configured for determining a feed forward steering angle reflecting a yaw moment generated by torque vectoring during turning driving of an electric vehicle in autonomous driving; and an adder configured for obtaining a target steering angle by adding the determined feedforward steering angle to a feedback steering angle, the feedback steering angle being a steering angle measured through a steering angle sensor.

According to an aspect of the present disclosure, a method for determining a target steering angle is provided, the method for determining a target steering angle, including: a first operation for determining a feedforward steering angle by reflecting a yaw moment generated by torque vectoring during turning driving of an electric vehicle in autonomous driving; and a second operation for obtaining a target steering angle by adding the determined feedforward steering angle to a feedback steering angle, the feedback steering angle being a steering angle measured through a steering angle sensor.

According to an aspect of the present disclosure, there is provided a computer-readable storage medium in which a program for executing the method on a computer is recorded.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
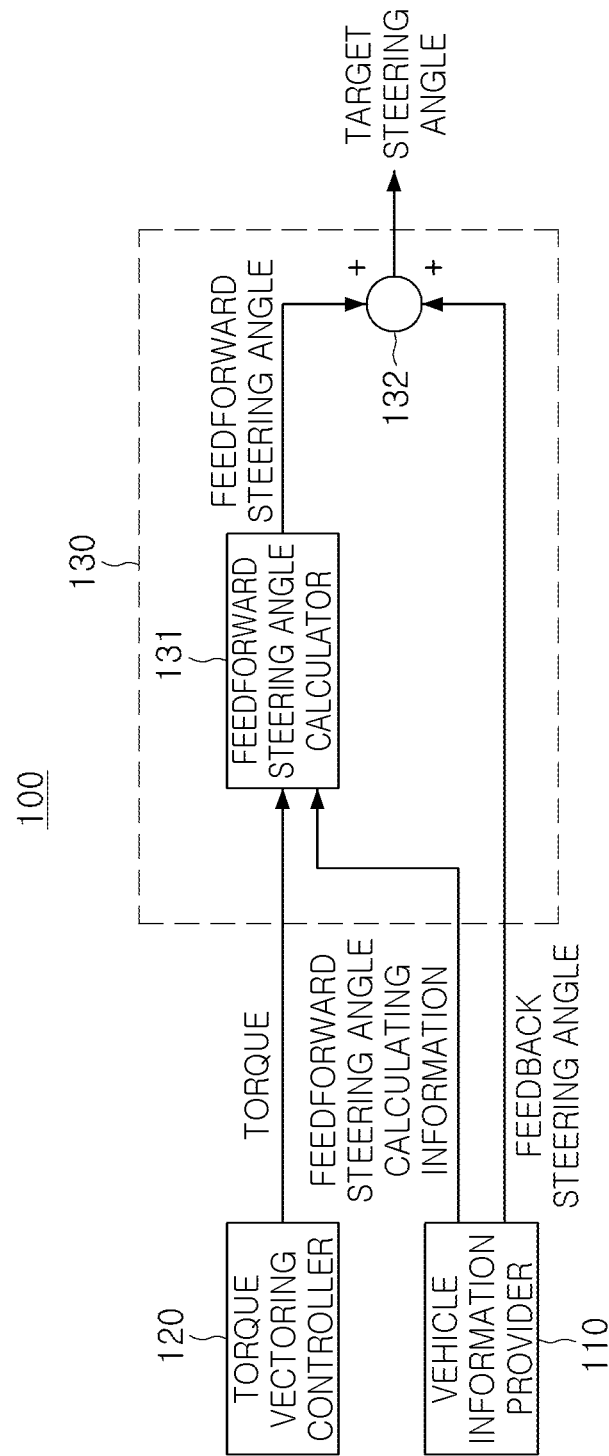
FIG. 1 is a conceptual diagram of a system including an apparatus of determining a target steering angle by torque vectoring during turning driving of an electric vehicle in autonomous driving according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments in the present disclosure will be described with reference to the accompanying drawings. The present disclosure may, however, be exemplified in many different forms and may not be construed as being limited to the specific embodiments set forth herein. Rather, these embodiments are provided so that the present disclosure will be thorough and complete, and will fully convey the scope of the present disclosure to those skilled in the art. In the drawings, a same reference numerals will be used throughout to designate the same or like elements, and the shapes and dimensions of elements may be exaggerated for clarity, and elements indicated by the same reference numerals in the drawings are the same elements.

In the present disclosure, an electric vehicle is a vehicle to which a four-wheel independent motor including a motor ('in-wheel motor') for driving each of four tires is applied, and may be an electric vehicle in autonomous driving, but it may be noted that the present disclosure is not limited thereto.

Figure 2:
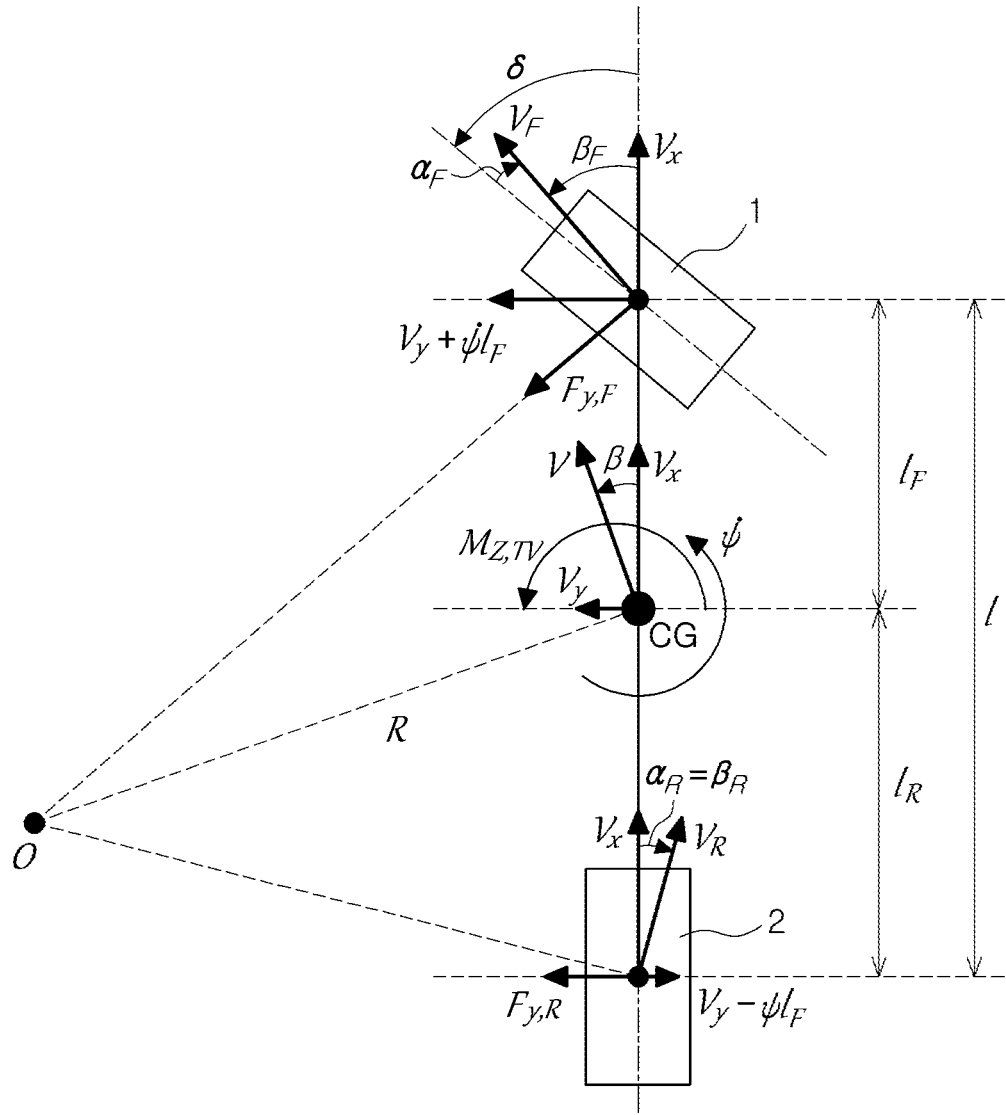
FIG. 2 is a diagram illustrating dynamics of an electric vehicle during turning driving according to an exemplary embodiment of the present disclosure.

FIG. 1 is a conceptual diagram of a system including an apparatus of determining a target steering angle by torque vectoring during turning driving of an electric vehicle in autonomous driving according to an exemplary embodiment of the present disclosure. FIG. 2 is a view exemplarily illustrating dynamics of the electric vehicle during turning driving.

In FIG. 2, $l_F$ is a length from center of gravity (CG) of the electric vehicle to a front wheel 1, $l_R$ is a length from the center of gravity (CG) of the electric vehicle to a rear wheel 2, and l is a length between the front wheel 1 and the rear wheel 2 (also referred to as an 'inter-axle distance'). R refers to a turning radius, CG refers to center of gravity of the electric vehicle, V refers to a speed of the electric vehicle, $V_x$ refers to a speed of the electric vehicle in a longitudinal direction, $V_y$ refers to a speed of the electric vehicle in a lateral direction, $\dot{\psi}$ refers to a yaw rate, β refers to a lateral slip angle at the center of gravity (CG), VF is a speed of the front wheel 1, $V_y + \dot{\psi} l_F$ is a lateral speed of the front wheel 1 when the electric vehicle rotates at a yaw angle of Ψ, $\alpha_F$ refers to a tire slip angle of the front wheel 1, $\beta_F$ is a lateral slip angle of the front wheel 1, δ refers to a steering angle of the front wheel 1, $V_R$ refers to a speed of the rear wheel 2, $V_y - \dot{\psi} l_F$ refers to a lateral speed of the rear wheel 2 when the electric vehicle rotates at a yaw angle of Ψ, $\alpha_R$ refers to a tire slip angle of the rear wheel 2, $\beta_F$ refers to a lateral slip angle of the rear wheel 2, $M_{Z,TV}$ refers to a yaw moment, $F_{y,F}$ refers to lateral force of a tire of the front wheel 1, and $F_{y,R}$ refers to lateral force of a tire of the rear wheel 2.

As shown in FIG. 1, the apparatus of determining a target steering angle 130 may include a feedforward steering angle calculator 131 and an adder 132.

The feedforward steering angle calculator 131 may determine a feedforward steering angle reflecting a yaw moment generated by torque vectoring during turning driving of the electric vehicle. The aforementioned feedforward steering angle may be a steering angle in which a yaw moment generated by torque vectoring is reflected in a preset feedforward steering angle.

To the present end, a torque applied to each motor, that is, a motor on a right side of the front wheel, a motor on a left side of the front wheel, a motor on a right side of the rear wheel, and a motor on a left side of the rear wheel, may be provided from a torque vectoring controller 120, and information for determining a feedforward steering angle may be provided from the vehicle information provider 110. Torque distribution in the above-described torque vectoring controller 120 is a matter of a control strategy, and a detailed description thereof is beyond the scope of the present disclosure, and thus a detailed description thereof will be omitted.

As information for determining the above-described feedforward steering angle, vehicle specifications and vehicle information may be included.

The vehicle specifications may include: mass (m) of the electric vehicle, a length ($l_F$) from the center of gravity (CG) to the front wheel 1, a length ($l_R$) from the center of gravity (CG) to the rear wheel 2 of the electric vehicle, and an inter-axle distance 1.

Meanwhile, as the vehicle information, the vehicle information may include w, a distance from the center of gravity (CG) to the wheel in a lateral direction, r, a dynamic radius of a tire, a lateral acceleration ($a_y$), a tire slip angle ($\alpha_F$) of the front wheel 1, tire stiffness of the front wheel 1 ($C_{\alpha,F}$), a tire slip angle ($\alpha_R$) of the rear wheel 2, tire stiffness ($C_{\alpha,R}$), of the rear wheel 2, a turning radius R, a lateral slip angle β, and a measured steering angle ($\delta_{FF}$).

Hereinafter, a process of determining the target steering angle by the apparatus of determining a target steering angle 130 will be described in detail with reference to FIGS. 1 to 2.

First, the feedforward steering angle calculator 131 may obtain a yaw moment ($M_{Z,TV}$) generated by torque vectoring during turning driving of the electric vehicle according to Equation 1 below.

$$M_{zTV} = \{(T_{FR} + T_{RR}) - (T_{FL} + T_{RL})\} w/r \quad \text{[Equation 1]}$$

where, $M_{Z,TV}$ may be a yaw moment, $T_{FR}$ may be torque applied to a motor on a right side of the front wheel by the torque vectoring, $T_{RR}$ may be torque applied to a motor on a right side of the rear wheel by the torque vectoring, $T_{FL}$ may be torque applied to a motor on a left side of the front wheel, $T_{FR}$ may be torque applied to a motor on a right side of the front wheel, w may be a lateral distance from the center of gravity (CG) to the wheel, r may be a dynamic radius of a tire.

Next, the feedforward steering angle calculator 131 may obtain lateral force of a tire ($F_{y,F}$, $F_{y,R}$) of each of the front wheel 1 and the rear wheel 2 according to Equation 2 below, by reflecting the yaw moment ($M_{Z,TV}$) obtained above.

$$F_{y,F} = \frac{m a_y l_R}{l} - \frac{M_{Z,TV}}{l} \quad \text{[Equation 2]}$$

$$F_{y,R} = \frac{m a_y l_F}{l} - \frac{M_{Z,TV}}{l}$$

where $F_{y,F}$ may be lateral force of a tire of the front wheel 1, $F_{y,R}$ may be lateral force of a tire of the rear wheel 2, m may be mass of the electric vehicle, $a_y$ may be lateral acceleration, $l_R$ may be a distance from center of gravity (CG) of the electric vehicle to the rear wheel 2, 1 may be an inter-axle distance, $M_{Z,TV}$ may be a yaw moment, and $l_F$ may be a length from the center of gravity (CG) of the electric vehicle to the front wheel 1.

Equation 2 described above may be obtained from a yaw moment equilibrium equation as in Equation 3 below.

$$F_{y,F} l = m a_y l_R - M_{z,TV}$$

$$F_{y,R} l = m a_y l_F + M_{z,TV} \quad \text{[Equation 3]}$$

Next, the feedforward steering angle calculator 131 may obtain a tire slip angle of each of the front and rear wheels according to Equation 4 below from the lateral force of a tire of each of the front and rear wheels obtained above.

$$\alpha_F = \frac{F_{y,F}}{C_{a,F}}$$
$$\alpha_R = \frac{F_{y,R}}{C_{a,R}}$$
[Equation 4]

where, $\alpha_F$ is a tire slip angle of the front wheel 1, $F_{y,F}$ is lateral force of a tire of the front wheel 1, $C_{\alpha,F}$ is tire stiffness of the front wheel 1, $\alpha_F$ is a tire slip angle of the rear wheel 2, $F_{y,R}$ may be lateral force of a tire of the rear wheel 2, and $C_{\alpha,R}$ may be tire stiffness of the rear wheel 2.

Finally, the feedforward steering angle calculator 131 may obtain a feedforward steering angle $\delta_{FF}$ according to Equation 5 below based on a tire slip angle αF and αR of each of the front wheel 1 and the rear wheel 2 respectively obtained above.

$$\delta_{FF} = l\kappa_{ref} - (\alpha_F - \alpha_R)$$
[Equation 5]

Here, the $\delta_{FF}$ may be a feedforward steering angle, l may be an inter-axle distance, kref may be 1/(R*cos β), where, R may be a turning radius, β may be a lateral slip angle at center of gravity, and $\alpha_F$ may be a tire slip angle of the front wheel 1, and $\alpha_R$ may be a tire slip angle of the rear wheel 2.

The above-described Equation 5 may be obtained according to the following sequence.

First, the following Equation 6 may be obtained for a tire slip angle of each of the front wheel 1 and the rear wheel 2 from a single track model. The above-described single track model is a model widely used as a vehicle lateral dynamics model, and a detailed description thereof will be omitted here for simplicity of the present disclosure.

$$\alpha_F = -(\delta - \beta_F)$$

$$\alpha_R = \beta_R$$
[Equation 6]

Next, a tangent β value of each of the front wheel 1 and the rear wheel 2 may be arranged as in Equation 7 below.

$$\tan \beta_F = \tan \beta + \frac{l_F \kappa}{\cos \beta}$$
$$\tan \beta_R = \tan \beta - \frac{l_R \kappa}{\cos \beta}$$
[Equation 7]

Next, the following Equation 8 may be obtained by subtracting the following Equation disposed below from the following Equation disposed above, among the two equations in Equation 6.

$$\tan \beta_F - \tan \beta_R = \frac{l\kappa}{\cos \beta}$$
[Equation 8]

Assuming that the tangent β value due to torque vectoring is small, the following Equation 9 may be obtained by combining with Equation 5. That is, the steering angle δ of the front wheel 1 obtained from Equation 8 may be a feedforward steering angle $\delta_{FF}$.

$$\delta = l\kappa_{ref} - (\alpha_F - \alpha_R) = \delta_{FF}$$
[Equation 9]

Finally, the adder 132 may obtain a target steering angle by adding the feedforward steering angle $\delta_{FF}$ obtained above according to Equation 10 below to a feedback steering angle $\delta_{FB}$. Here, the feedback steering angle may be a measured steering angle provided by the vehicle information provider 110.

$$\delta = \delta_{FF} + \delta_{FB}$$
[Equation 10]

Here, δ may be a target steering angle, $\delta_{FF}$ may be a feedforward steering angle, and $\delta_{FB}$ may be a feedback steering angle.

As described above, according to an exemplary embodiment of the present disclosure, by obtaining a feedforward steering angle reflecting a yaw moment generated by torque vectoring during turning driving of an electric vehicle in autonomous driving, and determining a target steering angle by adding the obtained feedforward steering angle to the feedback steering angle, even when torque vectoring (torque distribution) is performed during turning driving, there is an advantage that the electric vehicle can turn without departing from a target path.

Figure 3:
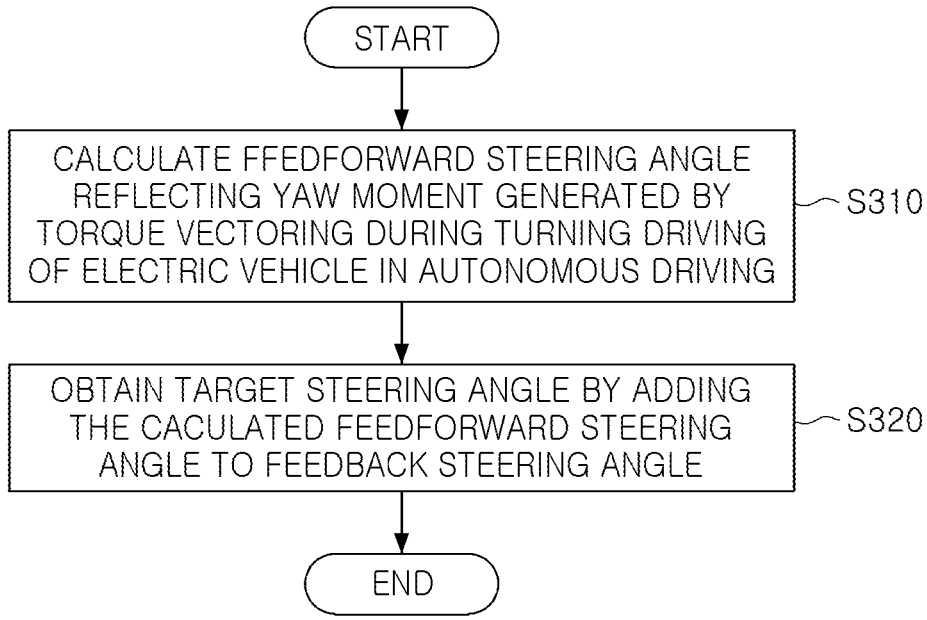
FIG. 3 is a flowchart illustrating a method for determining a target steering angle by torque vectoring during turning driving of an electric vehicle in autonomous driving according to an exemplary embodiment of the present disclosure.
Figure 4:
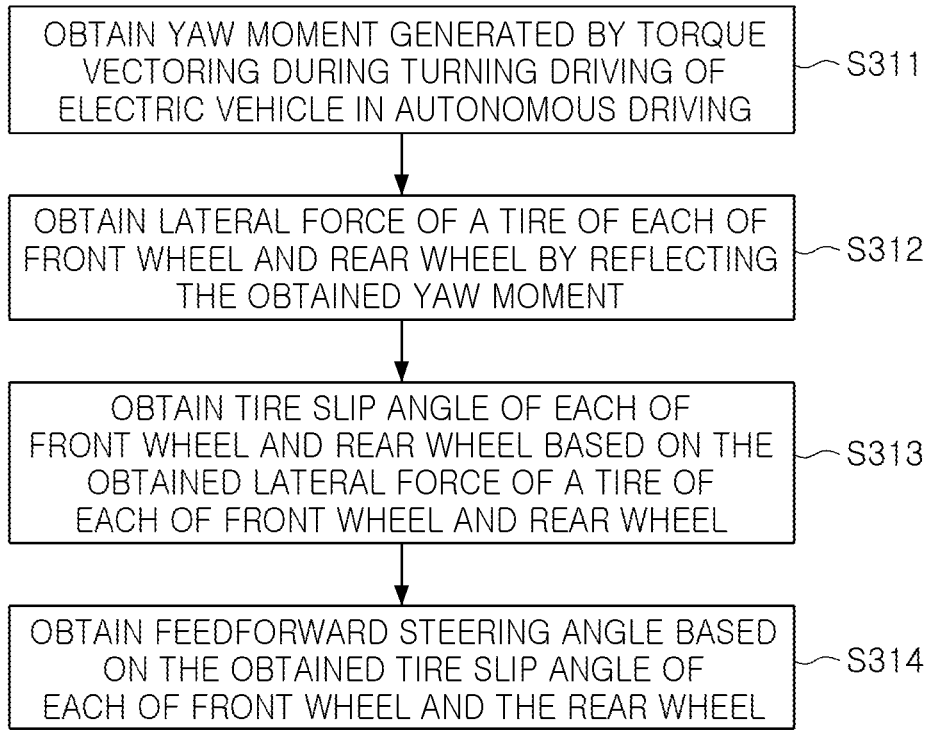
FIG. 4 is a flow chart illustrating step 310 of FIG. 3.

Finally, FIG. 3 is a flowchart illustrating a method of determining a target steering angle by torque vectoring during turning driving of an electric vehicle according to an exemplary embodiment of the present disclosure. FIG. 4 is a flow chart illustrating step 310 of FIG. 3.

Hereinafter, a method for determining a target steering angle (S300) according to an exemplary embodiment of the present disclosure will be described with reference to FIG. 1, FIG. 2, FIG. 3, and FIG. 4.

Referring to FIG. 1, FIG. 2, FIG. 3, and FIG. 4, the method for determining a target steering angle (S300) according to an exemplary embodiment of the present disclosure may be started by an operation for determining a feedforward steering angle (S310) reflecting a yaw moment generated by torque vectoring during turning driving of an electric vehicle in autonomous driving in a feedforward steering angle calculator 131.

In the above-described operation S310, as shown in FIG. 4, first, the feedforward steering angle calculator 131 may obtain a yaw moment ($M_{Z,TV}$) generated by torque vectoring during turning driving of an electric vehicle in autonomous driving according to Equation 1 described above (S311).

Thereafter, the feedforward steering angle calculator 131 reflects the yaw moment ($M_{Z,TV}$) obtained as above, and according to Equation 2 described above, lateral force of a tire ($F_{y,F}$, $F_{y,R}$) of each of a front wheel 1 and a rear wheel 2 may be obtained (S312).

Next, the feedforward steering angle calculator 131 may obtain a tire slip angle of each of the front and rear wheels according to Equation 4 described above based on the lateral force of each of the front and rear wheels obtained above (S313).

Next, the feedforward steering angle calculator 131 may obtain a feedforward steering angle ($\delta_{FF}$) according to Equation 5 below based on a tire slip angle ($\alpha_F$, $\alpha_R$) of each of the front wheels 1 and the rear wheels 2 obtained above (S314).

Finally, an adder 132 may obtain a target steering angle (δ) by adding the feedforward steering angle ($\delta_{FF}$) obtained above to the feedback steering angle ($\delta_{FB}$) according to Equation 10 described above. Here, as described above, the feedback steering angle may be a measured steering angle provided by the vehicle information provider 110.

Figure 5:
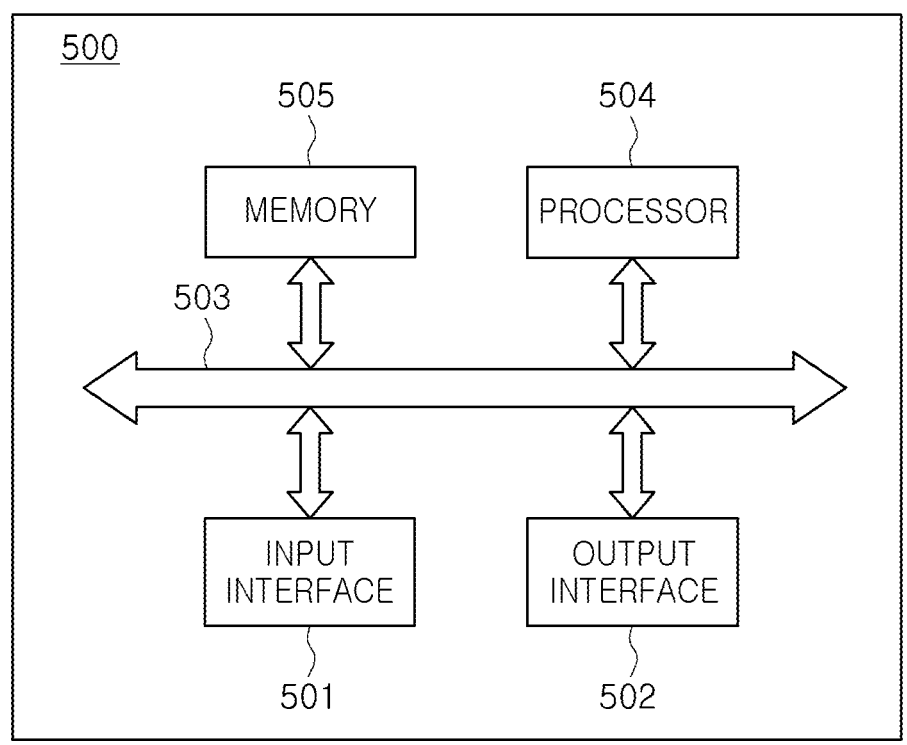
FIG. 5 is a block diagram of a computer device configured for fully or partially implementing an apparatus of determining a target steering angle according to an exemplary embodiment of the present disclosure.

Meanwhile, FIG. 5 is a block diagram of a computer device that can fully or partially implement an apparatus of determining a target steering angle 130 according to an exemplary embodiment of the present disclosure, and may be applied to the apparatus of determining a target steering angle 130 shown in FIG. 1.

As illustrated in FIG. 5, the computer device 500 may include an input interface 501, an output interface 502, a processor 504, and a memory 505, and the input interface 501, the output interface 502, the processor 504, and the memory 505, may be interconnected via a system bus 503.

In an exemplary embodiment of the present disclosure, the memory 505 is used to store a program, a command or a code, and the processor 504 executes the program, the command or the code stored in the memory 505, is configured to control the input interface 501 to receive a signal, is configured to control the output interface 502 to transmit a signal. The above-described memory 505 may include a read-only memory and a random access memory, and may provide instructions and data to the processor 504.

In an exemplary embodiment of the present disclosure, it should be understood that the processor 504 may be a central processing unit (CPU), another processor, a digital signal processor (DSP), an application specific integrated circuit (ASIC), a field programmable gate array (FPGA), or other programmable logic devices, a discrete gate or a transistor logic device, a discrete hardware component, or the like. The general purpose processor may be a microprocessor, or the processor may be any conventional processor, or the like.

In one implementation process, each method of FIG. 1 may be achieved by an integrated logic circuit of hardware or an instruction in a form of software in the processor 504. The content of the method disclosed in relation to the exemplary embodiment of the present disclosure may be implemented to be performed and completed by a hardware processor, or may be performed and completed by a combination of hardware and software modules of the processor. The software module may be disposed in a storage medium skilled in the art, such as a random access memory, a flash memory, a read-only memory, a programmable read-only memory or an electrically erasable programmable memory, a register, and the like. The corresponding storage medium is located in the memory 505, and the processor 504 reads information from the memory 505 and implements the contents of the above-described method in combination with hardware. To avoid duplication, detailed descriptions thereof are omitted herein.

As set forth above, according to an exemplary embodiment of the present disclosure, by obtaining a feedforward steering angle reflecting a yaw moment generated by torque vectoring during turning driving of an electric vehicle in autonomous driving, and determining a target steering angle by adding the obtained feedforward steering angle to a feedback steering angle, even when torque vectoring (torque distribution) is performed during turning driving, the electric vehicle has an advantage of being able to turn without departing from a target path.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of determining a target steering angle, the apparatus comprising:
    one or more processors, and
    a storage medium storing computer-readable instructions that, when executed by the one or more processors, cause the one or more processors to:
        determine a feed forward steering angle reflecting a yaw moment generated by torque vectoring during turning driving of an electric vehicle in autonomous driving; and
        obtain the target steering angle by adding the determined feedforward steering angle to a feedback steering angle, the feedback steering angle being a steering angle measured through a steering angle sensor; and
        controlling the autonomous driving of the electric vehicle based on the target steering angle.

2. The apparatus of claim 1, wherein the one or more processors is configured to:
    obtain the yaw moment generated by the torque vectoring during the turning driving of the electric vehicle,
    obtain lateral force of a tire of each of a front wheel and a rear wheel of the electric vehicle by reflecting the obtained yaw moment,
    obtain a tire slip angle of each of the front wheel and the rear wheel based on the obtained lateral force of the tire of each of the front wheel and the rear wheel, and
    obtain the feedforward steering angle based on the obtained tire slip angle of each of the front wheel and the rear wheel.

3. The apparatus of claim 2, wherein the yaw moment is expressed by the following equation:

$$M_{zTV} = \{(T_{FR} + T_{RR} - (T_{FL} + T_{RL})\} w/r$$

where, $M_{Z,TV}$ is a yaw moment, $T_{FR}$ is a torque applied to a motor on a right side of the front wheel by the torque vectoring, $T_{RR}$ is a torque applied to a motor on a right side of the rear wheel by the torque vectoring, $T_{FL}$ is a torque applied to a motor on a left side of the front wheel by the torque vectoring, $T_{RL}$ is a torque applied to a motor on a right side of the rear wheel by the torque vectoring, w is a lateral distance from center of gravity (CG) to the wheel, and r is a dynamic radius of the tire.

4. The apparatus of claim 2, wherein the lateral force of the tire is expressed by the following equation:

$$F_{y,F} = \frac{ma_y l_R}{l} - \frac{M_{Z,TV}}{l}$$

$$F_{y,R} = \frac{ma_y l_F}{l} - \frac{M_{Z,TV}}{l}$$

where, $F_{y,F}$ is lateral force of the tire of the front wheel, $F_{y,R}$ is lateral force of the tire of the rear wheel, m is mass of the electric vehicle, $a_y$ is lateral acceleration, $l_R$ is a length from center of gravity of the electric vehicle to the rear wheel, l is an inter-axle distance, $M_{Z,TV}$ is a yaw moment, and when is a length from the center of gravity of the electric vehicle to the front wheel.

5. The apparatus of claim 2, wherein the tire slip angle is expressed by the following equation:

$$\alpha_F = \frac{F_{y,F}}{C_{a,F}}$$

$$\alpha_R = \frac{F_{y,R}}{C_{a,R}}$$

where, $\alpha_F$ is the tire slip angle of the front wheel, $F_{y,F}$ is lateral force of the tire of the front wheel, $C_{\alpha,F}$ is tire stiffness of the front wheel, $\alpha_R$ is a tire slip angle of the rear wheel, $F_{y,R}$ is lateral force of the tire of the rear wheel, and $C_{\alpha,R}$ is tire stiffness of the rear wheel.

6. The apparatus of claim 2, wherein the feedforward steering angle is expressed by the following equation:

$$\delta_{FF} = l\kappa_{ref} - (\alpha_F - \alpha_R)$$

where, $\delta_{FF}$ is a feedforward steering angle, l is a length between the front wheel and the rear wheel, kref is $1/(R*\cos\beta)$, where, R is a turning radius, $\beta$ is a lateral slip angle at center of gravity, $\alpha_F$ is a tire slip angle of the front wheel, and $\alpha_R$ is a tire slip angle of the rear wheel.

7. A method for determining a target steering angle, which is performed on a computing device comprising one or more processors and a storage medium storing computer-readable instructions that can be executed by the one or more processors, the method comprising:
    determining, by the one or more processors, a feedforward steering angle by reflecting a yaw moment generated by torque vectoring during turning driving of an electric vehicle in autonomous driving;
    obtaining, by the one or more processors, a target steering angle by adding the determined feedforward steering angle to a feedback steering angle, the feedback steering angle being a steering angle measured through a steering angle sensor; and
    controlling the autonomous driving of the electric vehicle based on the target steering angle.

8. The method of claim 7, wherein the determining a feedforward steering angle includes:
    obtaining the yaw moment generated by the torque vectoring during turning driving of the electric vehicle;
    obtaining lateral force of a tire each of a front wheel and a rear wheel by reflecting the obtained yaw moment;
    obtaining a tire slip angle each of the front wheel and the rear wheel based on the obtained lateral force of the tire of each of the front wheel and the rear wheel; and
    obtaining the feedforward steering angle based on the obtained tire slip angle of each of the front wheel and the rear wheel.

9. The method of claim 8, wherein the yaw moment is expressed by the following equation:

$$M_{Z,TV} = \{(T_{FR} + T_{RR}) - (T_{FL} + F_{RL})\}w/r$$

where, $M_{Z,TV}$ is a yaw moment, $T_{FR}$ is a torque applied to a motor on a right side of the front wheel by the torque vectoring, $T_{RR}$ is a torque applied to a motor on a right side of the rear wheel by the torque vectoring, $T_{FL}$ is a torque applied to a motor on a left side of the front wheel by the torque vectoring, $T_{RL}$ is a torque applied to a motor on a right side of the rear wheel by the torque vectoring, w is a lateral distance from center of gravity (CG) to the wheel, and r is a dynamic radius of the tire.

10. The method of claim 8, wherein the lateral force of the tire is expressed by the following equation:

$$F_{y,F} = \frac{ma_y l_R}{l} - \frac{M_{Z,TV}}{l}$$

$$F_{y,R} = \frac{ma_y l_F}{l} - \frac{M_{Z,TV}}{l}$$

where $F_{y,F}$ is lateral force of a tire of the front wheel, $F_{y,R}$ is lateral force of a tire of the rear wheel, m is mass of the electric vehicle, $a_y$ is lateral acceleration, $I_R$ is a length from center of gravity of the electric vehicle to the rear wheel, l is an inter-axle distance, $M_{Z,TV}$ is a yaw moment, and $I_F$ is a length from the center of gravity of the electric vehicle to the front wheel.

11. The method of claim 8, wherein the tire slip angle is expressed by the following equation:

$$\alpha_F = \frac{F_{y,F}}{C_{a,F}}$$

$$\alpha_R = \frac{F_{y,R}}{C_{a,R}}$$

where, $\alpha_F$ is a tire slip angle of the front wheel, $F_{y,F}$ is lateral force of a tire of the front wheel, $C_{\alpha,F}$ is tire stiffness of the front wheel, $\alpha_F$ is a tire slip angle of the rear wheel, $F_{y,R}$ is lateral force of a tire of the rear wheel, and $C_{\alpha,R}$ is tire stiffness of the rear wheel.

12. The method of claim 8, wherein the feedforward steering angle is expressed by the following equation:

$$\delta_{FF} = l\kappa_{ref} - (\alpha_F - \alpha_R)$$

where, $\delta_{FF}$ is a feedforward steering angle, l is a length between a front wheel and a rear wheel, kref is $1/(R*\cos\beta)$, where, R is a turning radius, $\beta$ is a lateral slip angle at center of gravity, $\alpha_F$ is a tire slip angle of the front wheel, and $\alpha_R$ is a tire slip angle of the rear wheel.

13. A non-transitory computer-readable storage medium storing computer-readable instructions which causes a computing device to:
- determine, a feedforward steering angle by reflecting a yaw moment generated by torque vectoring during turning driving of an electric vehicle in autonomous driving; and
- obtain, a target steering angle by adding the determined feedforward steering angle to a feedback steering angle, the feedback steering angle being a steering angle measured through a steering angle sensor; and
- control the autonomous driving of the electric vehicle based on the target steering angle.

* * * * *